UNITED STATES PATENT OFFICE.

JOSEPH SCHNEIBLE, OF CHICAGO, ILLINOIS.

PROCESS OF TREATING FERMENTED BEVERAGES.

1,238,577.  Specification of Letters Patent.  Patented Aug. 28, 1917.

No Drawing.  Application filed January 11, 1916. Serial No. 71,486.

*To all whom it may concern:*

Be it known that I, JOSEPH SCHNEIBLE, a citizen of the United States, residing at Chicago, in the county of Cook and State of Illinois, have invented a new and useful Improvement in Processes of Treating Fermented Beverages, of which the following is a specification.

My invention relates to an improvement in such fermented beverages as contain albuminous matter in their original extract-compostion.

One object of my invention is to effect refining of these beverages preparatory to their final finishing for the market, thereby to avoid prolonged storage with resultant costliness and deteriorating influences, by the reaction of certain contained bodies on nitrogeneous matter in the beverages, and to permit the entire processes of their manufacture to be completed within the minimum of time and space.

The refining, referred to, consists in ridding such beverages of the objectionable products of fermentation, known, generally, as fusel-oils, without depriving them, in any material measure, of their ethyl alcohol content, or injuriously affecting the albumens in solution in the beverages or the characterizing qualities of the latter.

Further objects are to effect, by the positive and economical treatment which my process involves, enhancement of the palatableness and wholesomeness of the beverage treated; also its stabilization by the removal from it, as an effect of the process, of certain volatile matter of fermentation detrimental to the extract matter carried in solution and tending to cause turbidity in the finished product, thereby preventing further chemical reaction and physical change in the extract matter and thus fixing the brilliancy, flavor, taste and, in the case of beer, the foam-stability of the beverage.

I have more especially devised my process for the treatment of the fermented malt beverage known as beer, because its characteristics render it peculiarly susceptible to all the advantages of my treatment; and for that reason, and for the sake of brevity, the description hereinafter contained is confined to the practice of my process, on that particular product. The invention is useful, however, for treating all fermented beverages derived from liquids having albuminous matter in their contained extracts, and it is my intention to cover it for all such uses.

In the manufacture of malt beverages, when the sugar in the wort is fermented by yeast, there results a mixture consisting chiefly of ethyl alcohol, but containing also a number of higher alcohols, collectively known as "fusel oils." These are supposed to owe their origin to the action of zymase upon the protein matter present, rather than to decomposition of the sugar.

The boiling-point of beer is about 96° to 98° C., depending on its content of ethyl alcohol, and that of ethyl alcohol is 78° C.; while the boiling-points of the different bodies known as fusel-oils are materially higher even than the boiling-point of water, which is 100° C. For example, fermentation amyl alcohol, which is one of the more important components of the fusel-oils, boils at 132° C. These temperatures are given at 14.67 lbs. absolute pressure.

I have found that when beer is subjected to an absolute pressure of from 2 to 3 pounds per square inch, and its temperature is raised to 50°–62° C., or thereabout, preferably in the presence of steam, the fusel oils volatilize and are eliminated from the beverage without materially reducing its ethyl alcohol content. In fact, the loss of ethyl alcohol does not greatly, if at all, exceed 5 to 7 per cent. of the total thereof in the beverage; and this notwithstanding that the individual boiling-points of the fusel-oils are much higher than even the boiling-point of water. I have also found that this elinimation may be acomplished without detrimentally affecting the albuminous matter in solution in the beverage, provided the latter be kept from contamination by impregnating contact with atmospheric air during the treatment.

To practise my process, according to the best procedure known to me in the manufacture of beer, I prepare and brew a wort suitable for the type of beer desired, pitch it with yeast and allow it to ferment; all in any usual or suitable manner. When the desired degree of fermentation has been reached, the yeast and other undissolved matter are separated, in any known or suitable manner, out of the beer to clarify it. The clarified beer is then subjected to distillation (during and prior to which it is carefully kept from the contaminating influence of atmospheric air), for which there is maintained on the beer an absolute pressure of from 2 to 3 pounds per square inch, while the temperature is raised to 58°-62° C., or thereabout. These conditions of pressure and temperature are maintained thereafter throughout the distillation. It is desirable, in the meantime, in order to assist the elimination of the fusel-oils and prevent reflux thereof, to maintain a current of steam on the surface of the beverage, with the additional advantage of the action of the steam in breaking down the foam, which might otherwise be carried over with the distillate. The beverage is then cooled and carbonated by usual or desired methods, and its further treatment is that to which beer is ordinarily subjected to complete its preparation for the market.

The more important advantages resulting from the practice of my invention are the following:

The elimination from the beverage treated of the fusel-oils, which are undesirable because of their extreme toxic effect, offensive odor and taste; the elimination of other products of fermentation which detrimentally affect the stability of the beverage, and its foam-capacity, in the case of beer, and which are believed to be, principally, the aldehydes and different ethers; proper sterilization of the beverage—the pasteurizing temperature of beer being 58°-62° C.; and avoiding, by the treatment for obtaining these advantages, material, if any, modification of the desirable characterizing qualities of the beverage. Moreover, the eliminated alcohols form by-products of great commercial value.

Obviously, with the refined product of my process once obtained, the ethyl alcohol content may be quantitatively regulated by prolonging the treatment.

What I claim as new and desire to secure by Letters Patent is:—

1. The process which consists in treating at low temperatures and pressures fermented beverages containing albuminous matter in solution, to volatilize and eliminate substantially all of the higher boiling-point alcohols contained in the beverage treated, while retaining therein practically all of its contained ethyl alcohol and albuminous matter.

2. In the manufacture of fermented beverages containing albuminous matter in solution, the step which consists in subjecting a beverage to a pressure below atmospheric and a temperature above 50° C. until substantially all of the contained higher boiling-point alcohols are eliminated, while retaining in said beverage practically all of its contained ethyl alcohol and albuminous matter.

3. In the manufacture of fermented beverages containing albuminous matter in solution, the step which consists in subjecting a beverage to an absolute pressure of about 2 to 3 pounds per square inch and a pasteurizing temperature of about 58° to 62° C., and maintaining such pressure and temperature until substantially all of the contained higher boiling-point alcohols are eliminated, while retaining in said beverage practically all of its contained ethyl alcohol and albuminous matter.

4. In the manufacture of fermented beverages containing albuminous matter in solution, the process which consists in subjecting a beverage to a pressure below atmospheric and a temperature above 50° C. until substantially all of its contained higher boiling-point alcohols are eliminated while retaining in the beverage practically all of its contained ethyl alcohol and albuminous matter, and introducing a current of steam upon the liquid undergoing treatment.

5. In the manufacture of fermented beverages containing albuminous matter in solution, the process which consists in subjecting a beverage to a pressure below atmospheric and a pasteurizing temperature until all of its contained higher boiling-point alcohols are eliminated, while retaining in the beverage practically all of its contained ethyl alcohol and albuminous matter, and excluding atmospheric air from the beverage before, during and after subjecting it to said treatment.

6. In the manufacture of fermented beverages containing albuminous matter in solution and relatively small ethyl alcohol content, as in the case of beer and ale, the step which consists in volatilizing, under pressure below atmospheric and a pasteurizing temperature, and thereby eliminating substantially all of the higher boiling-point alcohols contained in the beverage treated, while retaining therein practically all of its contained ethyl alcohol and albuminous matter.

JOSEPH SCHNEIBLE.

In presence of—
A. C. FISCHER,
L. HEISLAR.